United States Patent
Yang et al.

(10) Patent No.: US 8,566,378 B2
(45) Date of Patent: Oct. 22, 2013

(54) SYSTEMS AND METHODS FOR RETRY SYNC MARK DETECTION

(75) Inventors: Shaohua Yang, Santa Clara, CA (US); Bruce McNeill, Yokohama (JP); Weijun Tan, Longmont, CO (US)

(73) Assignee: LSI Corporation, San Jose, CA (US)

( * ) Notice: Subject to any disclaimer, the term of this patent is extended or adjusted under 35 U.S.C. 154(b) by 527 days.

(21) Appl. No.: 12/894,221

(22) Filed: Sep. 30, 2010

(65) Prior Publication Data

US 2012/0084336 A1    Apr. 5, 2012

(51) Int. Cl.
*G06F 17/10*    (2006.01)

(52) U.S. Cl.
USPC .......................................................... 708/300

(58) Field of Classification Search
USPC ................................................. 708/300–323
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy et al. |
| 5,668,679 A | 9/1997 | Swearingen et al. |
| 5,696,639 A | 12/1997 | Spurbeck et al. |
| 5,781,129 A | 7/1998 | Schwartz et al. |
| 5,787,125 A | 7/1998 | Mittle |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Tan V. Mai

(74) *Attorney, Agent, or Firm* — Hamilton DeSanctis & Cha

(57) ABSTRACT

Various embodiments of the present invention provide systems and methods for sync mark detection. As an example, a sync mark detection circuit is discussed that includes a storage circuit, a plurality of noise predictive filter circuits, and a controller circuit. The storage circuit is operable to store a data input as a stored input. The plurality of noise predictive filters are operable to receive a processing input. At least one of the noise predictive filters is selectably modifiable to either increase the probability of finding a sync mark in the processing input or to maintain a baseline probability of finding the sync mark in the processing input. The controller circuit is operable to determine an operational mode that may be a standard operational mode, a bit flipping mode, or a filter modification mode.

30 Claims, 8 Drawing Sheets

(56) References Cited

U.S. PATENT DOCUMENTS

| | | |
|---|---|---|
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silverstrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,278,591 B1 | 8/2001 | Chang et al. |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,002,767 B2 | 2/2006 | Annampedu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,238 B2 | 3/2009 | Annampedu |
| 7,525,460 B1 | 4/2009 | Liu et al. |
| 7,602,568 B1 | 10/2009 | Katchmart |
| 7,620,101 B1 | 11/2009 | Jenkins |
| 7,630,155 B2 | 12/2009 | Maruyama et al. |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0095350 A1 | 5/2003 | Annampedu et al. |
| 2004/0179460 A1 | 9/2004 | Furumiya et al. |
| 2005/0046982 A1 | 3/2005 | Liu et al. |
| 2005/0157415 A1 | 7/2005 | Chiang et al. |
| 2005/0243455 A1 | 11/2005 | Annampedu |
| 2006/0031556 A1* | 2/2006 | Evans .................... 709/231 |
| 2007/0064847 A1 | 3/2007 | Gaedke |
| 2007/0071152 A1 | 3/2007 | Chen et al. |
| 2007/0103805 A1 | 5/2007 | Hayashi |
| 2007/0104300 A1 | 5/2007 | Esumi et al. |
| 2007/0183073 A1 | 8/2007 | Sutardja et al. |
| 2007/0230015 A1 | 10/2007 | Yamashita |
| 2007/0263311 A1 | 11/2007 | Smith |
| 2008/0056403 A1 | 3/2008 | Wilson |
| 2008/0080082 A1 | 4/2008 | Erden et al. |
| 2008/0212715 A1 | 9/2008 | Chang |
| 2008/0266693 A1 | 10/2008 | Bliss et al. |
| 2009/0002862 A1 | 1/2009 | Park et al. |
| 2009/0142620 A1 | 6/2009 | Yamamoto et al. |
| 2009/0245448 A1 | 10/2009 | Ran et al. |
| 2009/0274247 A1 | 11/2009 | Galbraith et al. |

OTHER PUBLICATIONS

U.S. Appl. No. 12/851,475, filed Aug. 5, 2010, Annampedu, Viswanath.

U.S. Appl. No. 12/887,327, filed Sep. 21, 2010, Llu et al.

U.S. Appl. No. 12/946,048, filed Nov. 15, 2010, Yang et al.

U.S. Appl. No. 12/947,962, filed Nov. 17, 2010, Liu et al.

U.S. Appl. No. 12/946,033, filed Nov. 15, 2010, Yang et al.

U.S. Appl. No. 12/955,789, filed Nov. 29, 2010, Annampedu et al.

U.S. Appl. No. 12/955,821, filed Nov. 29, 2010, Annampedu et al.

Annampedu and Aziz, "Adaptive Algorithms for Asynchronous Detection of Coded Servo Signals Based on Interpolation", IEEE Transactions on Magnetics, vol. 41, No. 10, Oct. 20, 2005.

Aziz and Annampedu, "Asynchronous Maximum Likelihood (ML) Detection of Servo repeatable Run Out (RRO) Data".

Aziz, Annampedu,"Interpolation Based Max.-Likelihood(ML) Detection Asynchronous Servo Repeatable Run Out Data", Digest, IEEE Int'l Mag. Conf. vol. 42 No. 10 pp. 2585-2587 Oct. 2006.

* cited by examiner

SYSTEMS AND METHODS FOR RETRY SYNC MARK DETECTION

BACKGROUND OF THE INVENTION

The present inventions are related to systems and methods for processing data, and more particularly to systems and methods for sync mark detection.

Storage devices often rely on reference patterns that when detected indicate subsequent data to be processed. When the reference pattern cannot be found, the subsequent data can become unrecoverable. A number of processes have been developed to increase the potential of identifying the reference pattern including adding another instance of the reference pattern some distance from an initial instance of the reference pattern. Such an approach requires substantial distance between the instances of the reference patterns to avoid a single media failure from damaging both reference patterns. Even where sufficient distance is employed, such an approach requires using a greater portion of a storage device for overhead purposes.

Hence, for at least the aforementioned reasons, there exists a need in the art for advanced systems and methods for sync mark detection.

BRIEF SUMMARY OF THE INVENTION

The present inventions are related to systems and methods for processing data, and more particularly to systems and methods for sync mark detection.

Various embodiments of the present invention provide sync mark detection circuits that include a storage circuit, a plurality of noise predictive filter circuits, and a controller circuit. The storage circuit is operable to store a data input as a stored input. The plurality of noise predictive filters are operable to receive a processing input. At least one of the noise predictive filters is selectably modifiable to either increase the probability of finding a sync mark in the processing input or to maintain a baseline probability of finding the sync mark in the processing input. The controller circuit is operable to determine an operational mode that may be a standard operational mode, a bit flipping mode, or a filter modification mode. Upon selecting the standard operational mode the controller circuit is further operable to: select the data input as the processing input, and to selectably modify the at least one of the noise predictive filters to maintain a baseline probability of finding the sync mark in the processing input. Upon selecting the bit flipping mode the controller circuit is further operable to: modify at least one bit in the stored input to yield a modified input; select the modified input as the processing input; and selectably modify the at least one of the noise predictive filters to maintain a baseline probability of finding the sync mark in the processing input. Upon selecting the filter modification mode the controller circuit is further operable to: select the stored input as the processing input and to selectably modify the at least one of the noise predictive filters to increase the probability of finding a sync mark in the processing input.

Other embodiments of the present invention provide sync mark detection circuits that include a plurality of noise predictive filters operable to receive a processing input. At least one of the noise predictive filters is selectably modifiable to change the favorability of finding a sync mark in the processing input. In some instances of the aforementioned embodiments, each of the noise predictive filters provides a respective noise predicted output. In such instances, the circuit further includes a data detector circuit operable to receive the respective noise predicted outputs and to provide a series of detected bits corresponding to the processing input.

In other instances of the aforementioned embodiments, the at least one of the noise predictive filters is selectably modifiable to bias an output of the noise predictive filter to increase the probability of finding a transition supported by the noise predictive filter. In such instances, increasing the probability of finding the transition increases the probability of finding the sync mark in the processing input. In some cases, biasing the output includes adding an offset to the output. In other cases, biasing the output includes multiplying the output by a value greater than unity. In various cases, the circuit further includes a storage circuit operable to store a data input as a stored input. In such cases, the processing input is the stored input when the at least one of the noise predictive filters is selectably modified to increase the probability of finding the transition. Otherwise, the processing input is the data input when the at least one of the noise predictive filters is selectably modified to maintain a baseline probability of finding the transition.

In various instances of the aforementioned embodiments, the at least one of the noise predictive filters is selectably modifiable to bias an output of the noise predictive filter to decrease the probability of finding a transition supported by the noise predictive filter. In such instances, decreasing the probability of finding the transition increases the probability of finding the sync mark in the processing input. In other instances of the aforementioned embodiments, the at least one of the noise predictive filters is selectably modifiable by modifying a filter coefficient to increase the probability of finding a transition supported by the noise predictive filter. In such instances, increasing the probability of finding the transition increases the probability of finding the sync mark in the processing input. In other instances, the at least one of the noise predictive filters is selectably modifiable by modifying a filter coefficient to decrease the probability of finding a transition supported by the noise predictive filter. In such instances, decreasing the probability of finding the transition increases the probability of finding the sync mark in the processing input.

In one or more instances of the aforementioned embodiments, the circuit further includes a storage circuit operable to store a data input as a stored input, and a controller circuit. The controller circuit is operable to modify at least one bit in the stored input to yield a modified input, and to provide the modified input as the processing input when a retry condition is requested and when the at least one of the noise predictive filters is selectably modified to maintain a baseline probability of finding a transition particular to the at least one of the noise predictive filters. In one particular instance, the controller circuit is further operable to successively modify different bits in the stored input to yield the modified input and to select reprocessing of the modified input.

Yet other embodiments of the present invention provide sync mark detection circuits that include a storage circuit and a controller circuit. The storage circuit is operable to store a data input as a stored input. The controller circuit is operable to determine an operational mode selected from a group consisting of: a standard operational mode and a bit flipping mode. Upon selecting the standard operational mode the controller circuit is further operable to: select the data input as a processing input, and select querying the processing input for a sync mark. Upon selecting the bit flipping mode the controller circuit is further operable to: modify at least one bit in the stored input to yield a modified input, select the modified input as the processing input, and to select querying the processing input for the sync mark.

In some instances of the aforementioned embodiments, the modified input is a first modified input, and the at least one bit is a first set of bits. In such instances, the controller circuit is further operable to: modify a second set of bits in the stored input to yield a second modified input; select the second modified input as the processing input; and select querying the processing input for a sync mark. In some cases, the first set of bits is a single bit, and the second set of bits is a single bit. In various cases, the first set of bits overlaps the second set of bits. In one or more cases, the first set of bits is mutually exclusive of the second set of bits. In some cases, the first set of bits are non-consecutive bits in the stored input.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for processing data, and more particularly to systems and methods for detecting data sequences.

Figure 1:
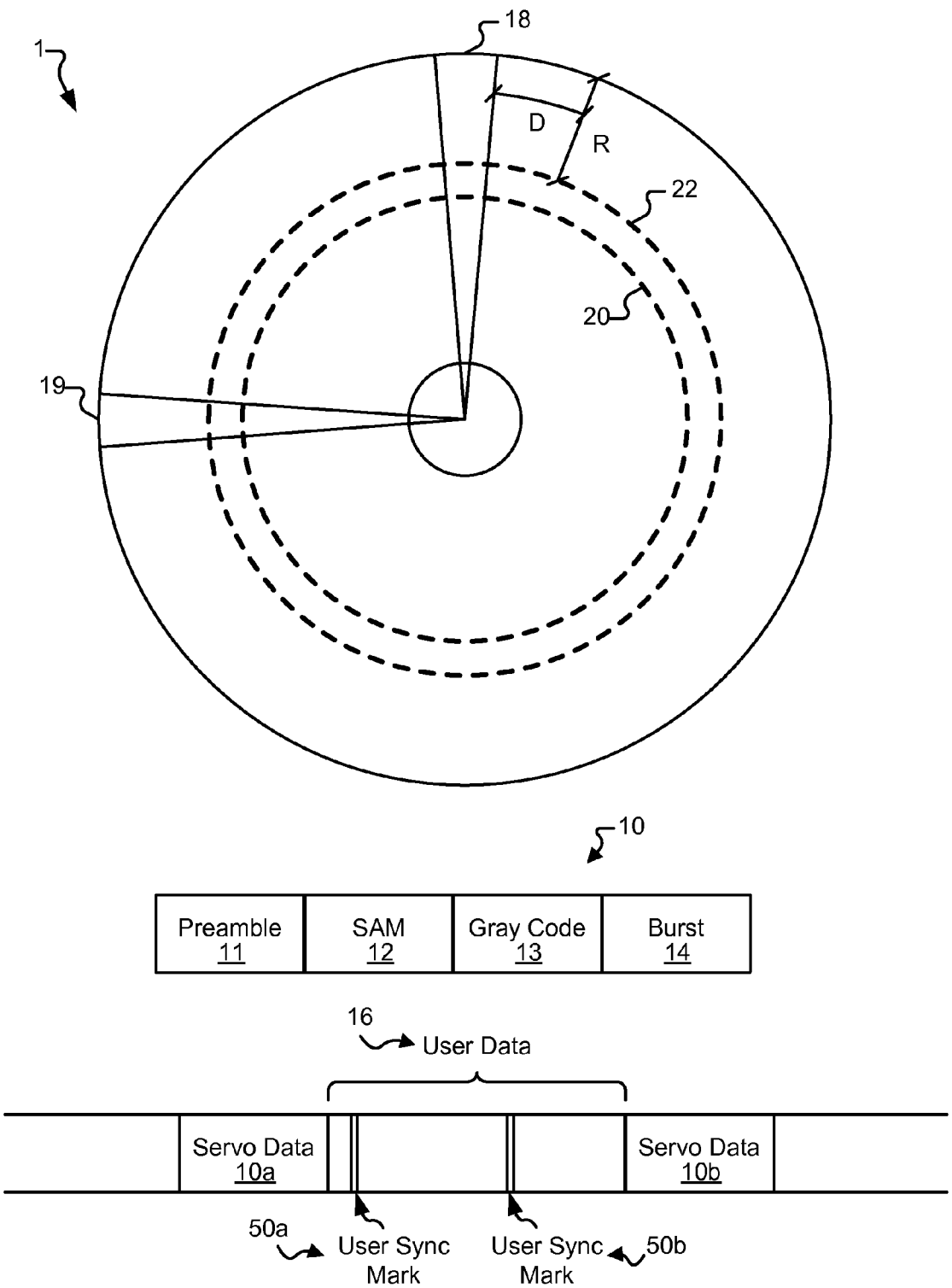
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

Figure 2:
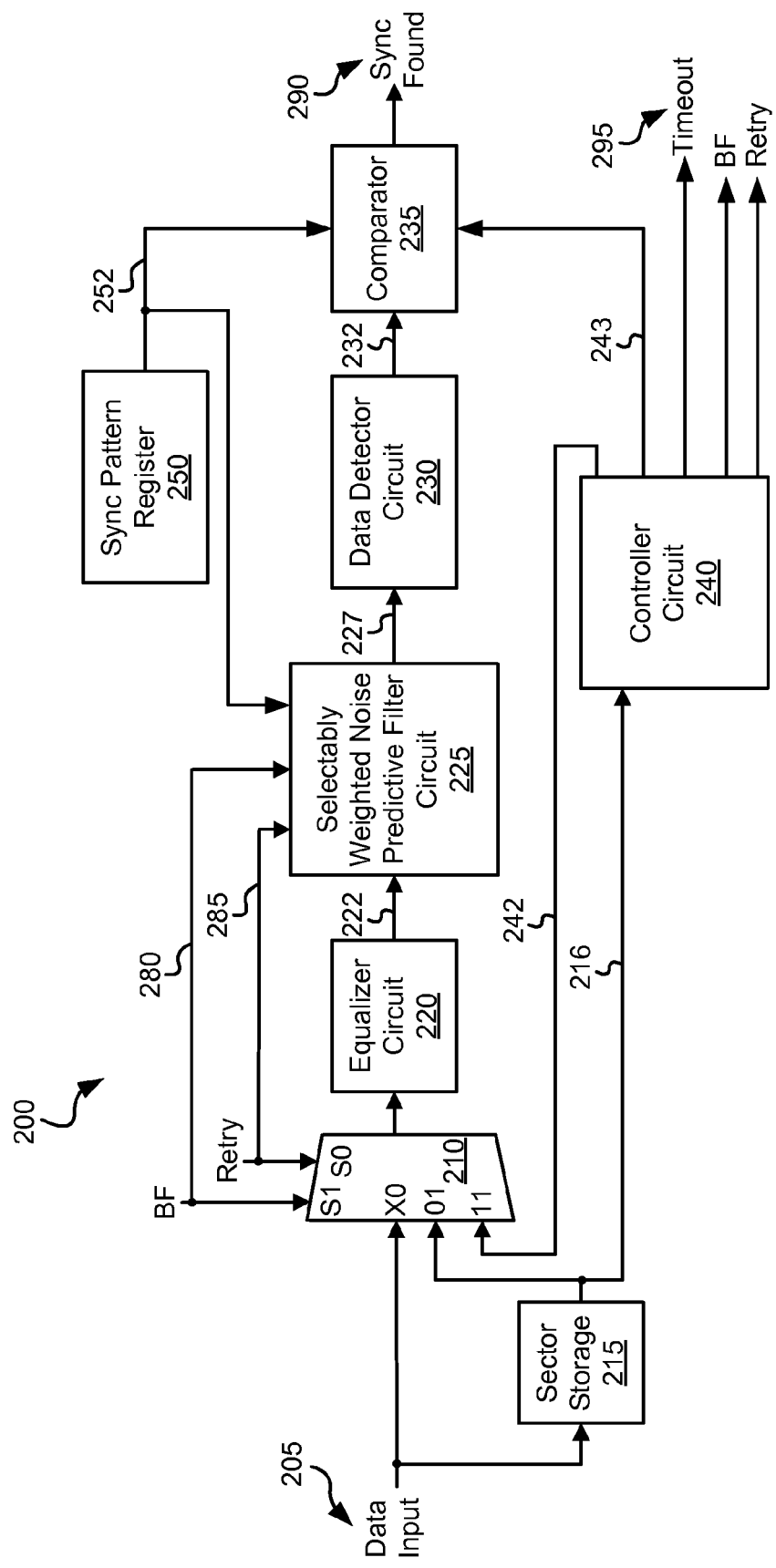
FIG. 2 depict a sync mark detection circuit in accordance with one or more embodiments of the present invention.

Turning to FIG. 2, a sync mark detection circuit 200 is shown in accordance with one or more embodiments of the present invention. Sync mark detection circuit 200 includes a selector circuit 210 that is operable to select between a data input 205, a stored data input 216 from a sector storage memory 215, and a modified stored data input 242 received from a controller circuit 240. Selector circuit 210 may be any circuit known in the art that is capable of selecting between a number of outputs based upon one or more control inputs. In particular embodiments of the present invention, selector circuit 210 is a multiplexer circuit as are known in the art. Selector circuit 210 selects between the available inputs depending upon an operational mode of sync mark detection circuit 200 as indicated by a bit flipping control signal 280 and a retry control signal 285 that are provided by control circuit 240. In a standard operational mode, retry control signal 285 is a logic '0' meaning that data input 205 is selected as the output of selector circuit 210. Data input signal 205 may be, for example, a series of digital samples of an information signal derived from a hard disk storage medium. Based upon the disclosure provided herein, one of ordinary skill in the art will recognize a variety of other sources of data input signal 205.

The output of selector circuit 210 is provided to an equalizer circuit 220 that equalizes the received input to a target. Equalizer circuit 220 may be any circuit known in the art that is capable of equalizing a received signal. Equalizer circuit 220 provides an equalized output 222 to a selectably weighted noise predictive filter circuit 225. In some embodiments of the present invention, selectably weighted noise predictive filter circuit 225 includes a number of finite impulse response filters that are each tuned to predictively filter a given transition. One or more of the individual filters may be modifiable depending upon whether a retry mode is selected (i.e., retry control signal 285 is asserted) or whether a bit flipping mode is selected (i.e., bit flipping control signal 280 is asserted). The individual filters may be modified by either biasing an output from the particular filter as is discussed more fully below in relation to FIG. 3, or the individual filters may be modified by changing one or more filter coefficients that govern the operation of the particular filter.

The outputs from each of the respective filters are provided together as a filter output 227 to a data detector circuit 230. Data detector circuit 230 may be any data detector circuit known in the art. In on particular embodiment of the present invention, data detector circuit 230 is a multi-state maximum likelihood detector circuit as are known in the art. In such a case, the number of individual filter circuits included in selectably weighted noise predictive filter circuit 225 may be implemented to match the number of possible state transitions offered by data detector circuit 230. For example, where data detector circuit 230 is a sixteen state data detector circuit, selectably weighted noise predictive filter circuit 225 may comprise thirty-two individual filters with each of the respective filter outputs corresponding to the branch metrics of each of the possible state transitions in data detector 230.

Data detector circuit 230 provides a series of detected bits 232 to a comparator circuit 235. Comparator circuit 235 compares the received detected bits 232 to a sync pattern 252 available from a sync pattern register 250. In some cases, sync pattern 252 is hard wired in sync pattern register 250, while in other cases sync pattern 252 is programmable by writing a different pattern to sync pattern register 250. Where a match is found between sync pattern 252 and detected bits 232 during a time when a sync mark is expected, comparator circuit 235 asserts a sync found signal 290. Sync found signal 290 may be used by other circuitry (not shown) as a reference location and/or time for additional processing.

Controller circuit 240 may be any circuit known in the art that is capable of providing control outputs to govern operation of sync mark detection circuit 200. In one particular embodiment of the present invention, controller circuit 240 is a firmware based microcontroller as are known in the art. Controller circuit 240 provides retry control signal 285 and bit flipping control signal 280 that govern what data is processed in search of a sync mark. In addition, controller circuit 240 provides a timeout signal 295 that indicates that a region during which a sync mark was detected has passed. Controller circuit 240 also provides a window signal 243 to comparator circuit 235 that enables assertion of sync found signal 290. Such a signal avoids assertion of sync found signal 290 outside of a range where the sync mark was expected. Further, controller circuit 240 receives stored data input 216 from sector storage 215, modifies one or more bits therein, and provides the result as a bit flipped output 242 to selector circuit 210.

In operation, sync pattern register 250 is initially programmed with a sync pattern 252 that is provided as an output to comparator circuit 235 where it is compared with detected bits 232. As processing is completed on data input 205, data input 205 is stored to sector storage 215 where the stored data can be used at a later point for a retry where for some reason a sync mark detection failure occurs. Controller circuit 240 initially asserts bit flipping control signal 280 and retry control signal 285 as logic '0s' such that data input 205 is provided to equalizer circuit 220. In this condition, standard processing by selectably weighted noise predictive filter circuit 225 operates without any biasing of the outputs from each of the respective filters or any modification of any of the coefficients applied to each of the respective filters. The output from selector circuit 210 is equalized by equalizer circuit 222 resulting in equalized output 222 being provided to selectably weighted noise predictive filter circuit 225. In turn, selectably weighted noise predictive filter circuit 225 performs noise predictive filtering on equalized output 222 to yield filter output 227 to a data detector circuit 230. Data detector circuit 230 performs a data detection on the received input to yield detected bits 232.

Controller circuit 240 includes a location identification function that identifies regions that are likely to include a sync mark. During processing through these regions, controller circuit 240 asserts window signal 243. When window signal 243 is asserted and a match between sync pattern 252 and detected bits 232 is found, comparator circuit 235 asserts sync found signal 290. In addition, controller circuit 240 includes a timeout function that limits a period over which a search for a sync mark occurs. In some cases, the timeout function causes assertion of timeout signal 295 when a region where an expected sync mark has been processed without finding the sync mark.

Where a timeout condition occurs, controller circuit 240 asserts retry control signal 285 as a logic '1' and bit flipping control signal 280 is asserted as a logic '0'. This causes stored data from sector storage 215 to be provided as the output of selector circuit 210 to equalizer circuit 220. In this condition, modified processing by selectably weighted noise predictive filter circuit 225 operates by either biasing the outputs from each of the respective filters or modifying the coefficients applied to each of the respective filters. The output from selector circuit 210 is equalized by equalizer circuit 222 resulting in equalized output 222 being provided to selectably weighted noise predictive filter circuit 225 that increases the probability of finding certain patterns leading to the finding of a sync mark, and/or decreases the probability of finding other patterns that do not lead to the finding a sync mark. For example, the following sync mark pattern may be used:

'1100 0000 0000 0000 0000 0000 1100 0000'.

In this case, selectably weighted noise predictive filter circuit 225 may be selectably modified to increase the probability that data detector circuit 230 will make decisions in favor of all zero patterns. This may be done, for example, by increasing the coefficients for the filters in selectably weighted noise predictive filter circuit 225 that contain transitions '101' and '010'. This increase in coefficients may also be applied to the filters in selectably weighted noise predictive filter circuit 225 that contain transitions '011', '100', '110' and/or '001'. It should be noted that the aforementioned example of three value filters may be replaced with filters of other lengths depending upon the particular design. Alternatively to modifying the coefficients for the filters in selectably weighted noise predictive filter circuit 225, outputs from respective ones of the filters in selectably weighted noise predictive filter circuit 225 may be biased in favor of all zero patterns. The biasing may be accomplished by adding a bias value to favored outputs, multiplying a favored output by a value greater than unity, subtracting a bias value from unfavored outputs, and/or multiplying an unfavored output by a value less than unity. For example, the outputs from the filters can be biased for patterns '1010', '0101', '0111' and '1110' to avoid data detector circuit 230 making a decision in favor of these states. In either case, the aforementioned processes change the decision boundary between two possible outcomes of data detector circuit 230 in such a way that raises the likelihood of finding a given sync mark.

Detected bits 232 generated using the modified coefficients and/or biased outputs from selectably weighted noise predictive filter circuit 225 are compared with sync pattern 252. When window signal 243 is asserted and a match between sync pattern 252 and detected bits 232 is found, comparator circuit 235 asserts sync found signal 290.

Where a sync mark is not found in the defined window, controller circuit 240 again asserts timeout signal 295 and asserts bit flipping control signal 210. This causes modified stored data input 242 from controller circuit 240 to be provided as the output of selector circuit 210 to equalizer circuit 220. In this condition, modified processing by selectably weighted noise predictive filter circuit 225 operates without any biasing of the outputs from each of the respective filters or any modification of any of the coefficients applied to each of the respective filters. The output from selector circuit 210 is equalized by equalizer circuit 222 resulting in equalized output 222 being provided to selectably weighted noise predictive filter circuit 225. In turn, selectably weighted noise predictive filter circuit 225 performs noise predictive filtering on equalized output 222 to yield filter output 227 to a data detector circuit 230. Data detector circuit 230 performs a data detection on the received input to yield detected bits 232.

Comparator circuit 235 compares sync pattern 252 with detected bits 232 to determine whether a sync mark has been found. During processing through these regions, controller circuit 240 asserts window signal 243. When window signal 243 is asserted and a match between sync pattern 252 and detected bits 232 is found, comparator circuit 235 asserts sync found signal 290. Where a sync mark is not found, controller circuit 240 asserts timeout signal 295 and makes another change to stored data input 216 to yield another modified stored data input 242. This newly modified stored data input 242 is then processed looking for a sync mark. This process may be repeated a number of times modifying different bits and/or series of bits in stored data input 216 until either a sync mark is found or until the search is considered exhausted.

In some cases, the bit flipping process begins by flipping an individual bit within a region where a sync mark is expected and processing the data stream. Where a sync mark is not found, the next individual bit within the region where the sync mark is expected is flipped, and the newly modified data is processed to identify a sync mark. This process is continued until either a sync mark is found or until all individual bits within the region have been flipped and the data reprocessed. Two or more bit patterns may then be flipped together in an expanding search over the region.

Once a sync mark is found, data processing conditions are returned to a standard processing mode. For example, where a sync mark is found in data input 205, sync found signal 290 is asserted. As this was done in standard processing mode, there is no reason to revert to a previous processing mode. Similarly, where a retry is performed using the bit flipping mode resulting in assertion of sync found signal 290, the operation of selectably weighted noise predictive filter circuit 225 was already in a standard mode so there is no reason to revert to a previous processing mode. In contrast, where a retry is performed using either coefficient or output modification in selectably weighted noise predictive filter circuit 225, identification of a sync mark is followed by reverting the operation of selectably weighted noise predictive filter circuit 225 back to its standard mode.

Figure 3:
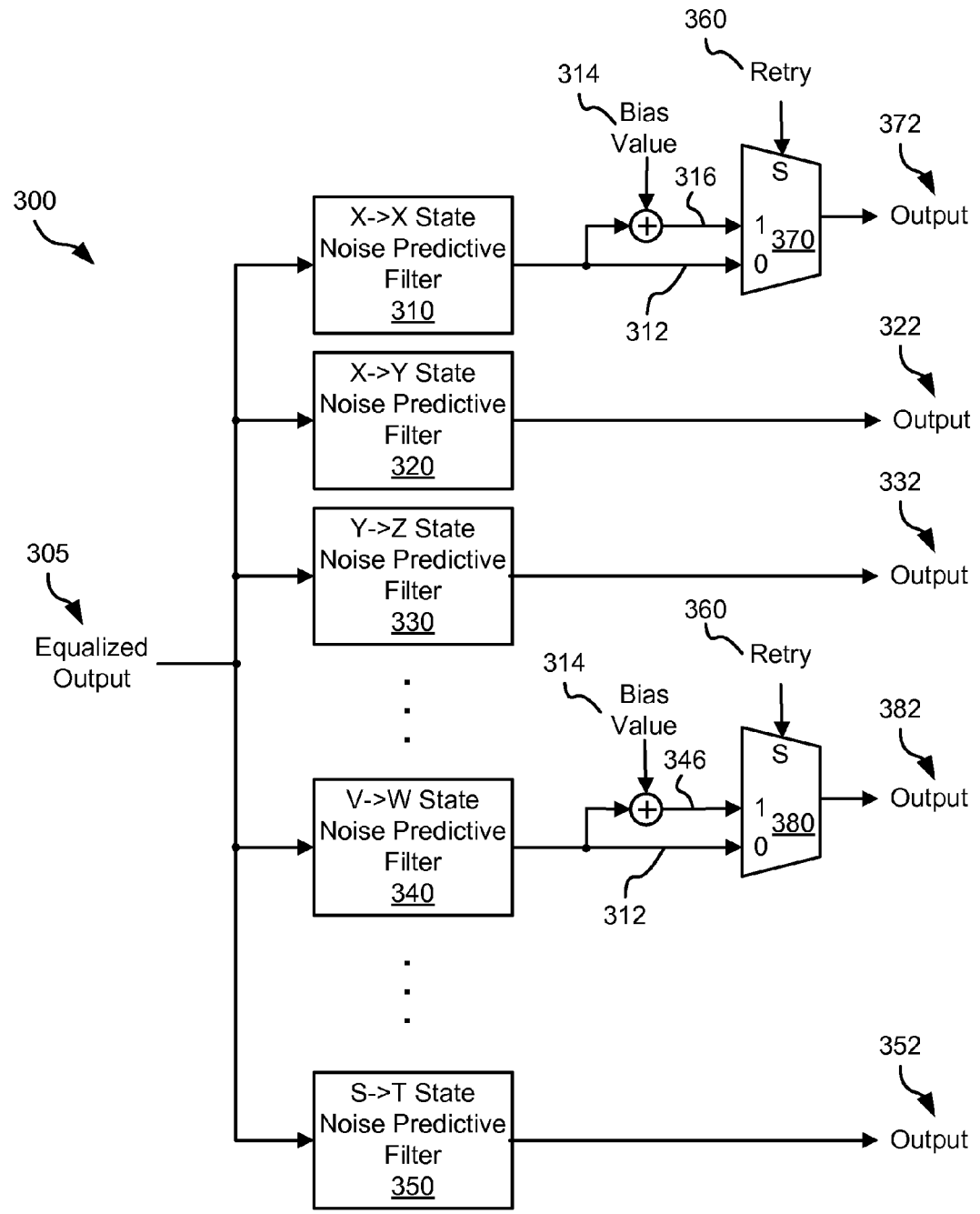
FIG. 3 shows a noise predictive filter circuit including selectable retry biasing in accordance with various embodiments of the present invention.

Turning to FIG. 3, a noise predictive filter circuit 300 including selectable retry biasing is shown in accordance with various embodiments of the present invention. Noise predictive filter circuit 300 may be used in place of selectably weighted noise predictive filter circuit 225 in embodiments where output biasing is employed. Noise predictive filter circuit 300 includes a number of noise predictive filters 310, 320, 330, 340, 350, that are each tuned for a particular transition. Each of noise predictive filters 310, 320, 330, 340, 350 receive an equalized output 305 from an upstream equalizer circuit. The number of noise predictive filters included in noise predictive filter circuit 300 may be selected based upon a number of states in a downstream data detector circuit (e.g., data detector circuit 230). For example, where the downstream data detector circuit is a sixteen state maximum likelihood detector circuit, noise predictive filter circuit 300 may be designed to include thirty-two noise predictive filters corresponding to each of the possible state transitions.

As shown, noise predictive filter 310 provides an output 312, noise predictive filter 320 provides an output 322, noise predictive filter 330 provides an output 332, noise predictive filter 340 provides an output 342, and noise predictive filter 350 provides an output 352. One or more of the noise predictive filters may be modified to either increase or decrease a probability associated with the given transition. As shown, the modification may be applied to output 312 where a bias value is added to output 312 to yield a modified output 316. When a retry is selected through assertion of a retry control signal 360, a selector circuit 370 provides modified output 316 as output 372 in place of output 312. Similarly, the modification may be applied to output 342 where a bias value is added to output 342 to yield a modified output 346. When a retry is selected through assertion of a retry control signal 360, a selector circuit 380 provides modified output 346 as output 382 in place of output 342. It should be noted that more or fewer than the depicted noise predictive filters may have modified outputs.

It should be noted that a different bias value may be used that is multiplied by the output of a given noise predictive filter rather than added as shown in the embodiment depicted in FIG. 3. Further, it should be noted that the operation each of noise predictive filters 310, 320, 330, 340, 350 is governed by coefficients. Rather than the biasing approach of the embodiment depicted in FIG. 3, the coefficients for one or more of the noise predictive filters may be modified to either increase or decrease the value of the output.

Figure 4:
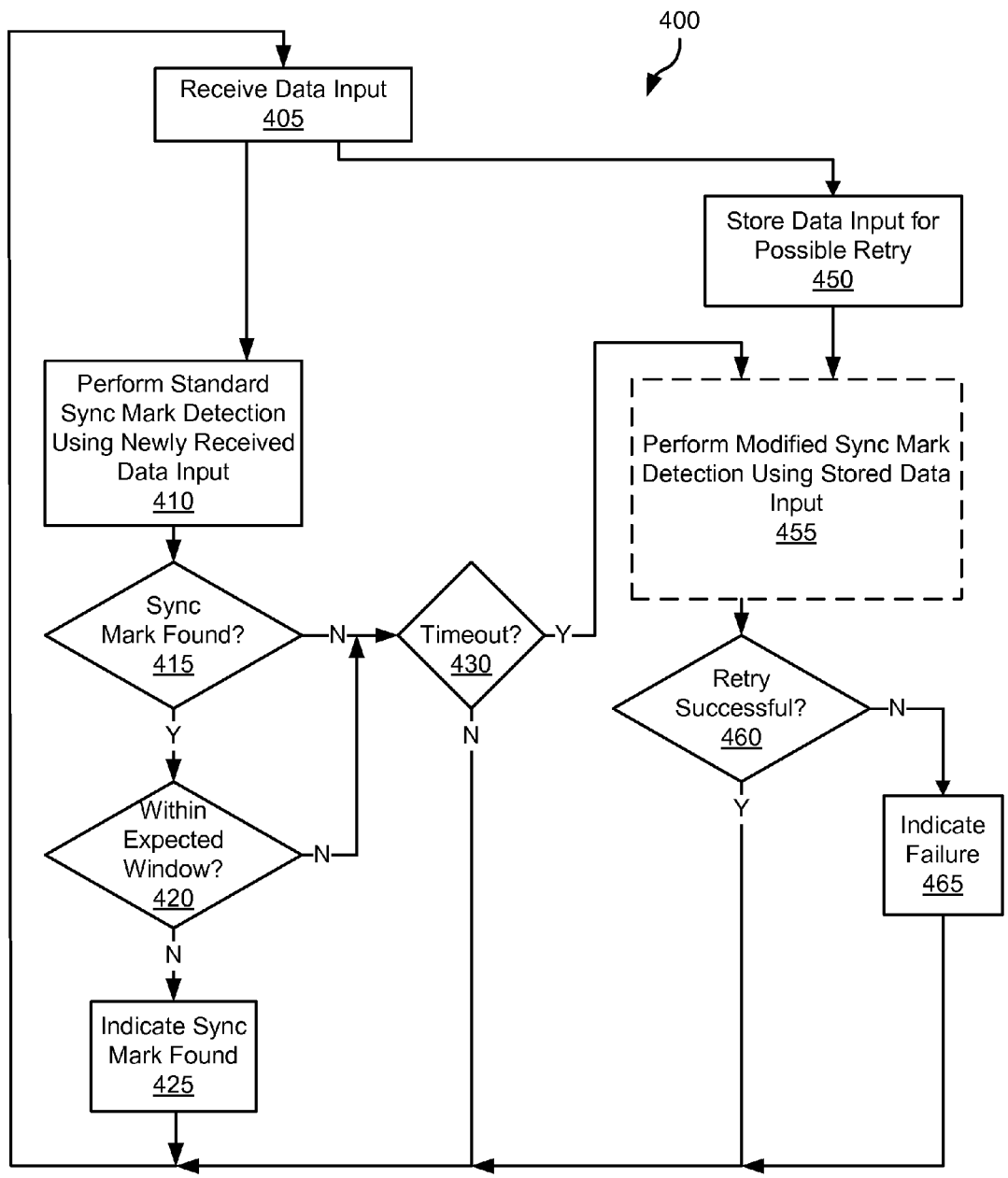
FIG. 4 is a flow diagram showing a method for sync mark detection processing in accordance with one or more embodiments of the present invention.

Turning to FIG. 4, a flow diagram 400 shows a method for sync mark detection processing in accordance with one or more embodiments of the present invention. Following flow diagram 400, a data input is received (block 405). Data input may be, for example, a series of digital values corresponding to an analog signal input derived from a hard disk drive. The series of inputs may be received on a bit by bit basis. Based upon the disclosure provided herein, one of ordinary skill in the art will recognize a variety of sources from which a data input may be derived. As received, the data input is stored for a possible retry (block 450). This may include storing data for a given window of time to a storage medium. The storage medium may be any storage medium known in the art including, but not limited to, a random access memory or a first-in-first out memory as are known in the art. Based upon the disclosure provided herein, one of ordinary skill in the art will recognize a variety of storage mediums that may be used to store the received data input.

A standard sync mark detection process is performed on the newly received data input (block 410). Such sync mark detection may be any sync mark process known in the art. For example, the data input may be equalized to a equalization target. Subsequently, the resulting equalized output is provided to a noise predictive filter that provides a number of noise predictive outputs each tuned to particular transitions. The noise predictive outputs are provided to a data detector circuit that performs a data detection yielding a series of detected outputs. The series of predicted outputs are compared with a given sync mark pattern to determine whether a sync mark has been found (block 415). Where a sync mark has been found (block 415), it is determined whether the identified sync mark occurred within a defined window (block 420). Where the sync mark was within the expected window (block 420), a sync mark found indication is asserted (block 425).

Alternatively, where either a sync mark was not found (block 415) or an identified sync mark was outside of an expected window (block 420), it is determined whether a timeout condition occurred (block 430). Where a timeout condition has not occurred (block 430), the processes are repeated beginning with the reception of the next received data input (block 405). Alternatively, where a timeout condition occurs (block 430), a retry condition is triggered where a modified sync mark detection is performed on the previously stored data input (block 455). This modified sync mark detection processing may include modifying the output of a noise predictive filter to favor finding a sync mark within a data stream, modifying filter coefficients of a noise predictive filter to favor finding a sync mark within a data stream, and/or performing a series of successive bit flips (i.e., modifying a logic '1' to a logic '0' or modifying a logic '0' to a logic '1') in the stored data stream on one or more bits at a time followed by reprocessing. Such approaches are more fully described below in relation to FIG. 5 and FIG. 6.

Upon completion of the retry processing (block 455), it is determined whether retry processing was successful (i.e., resulted in identifying a sync mark) (block 460). Where it is determined that the retry was not successful (block 460), a failure is indicated (block 465) and processing is returned to standard processing. Where the retry was successful (block 460), processing is returned to standard processing. The aforementioned return to standard processing includes reverting any modified output bias and/or coefficients to normal levels.

Figure 5:
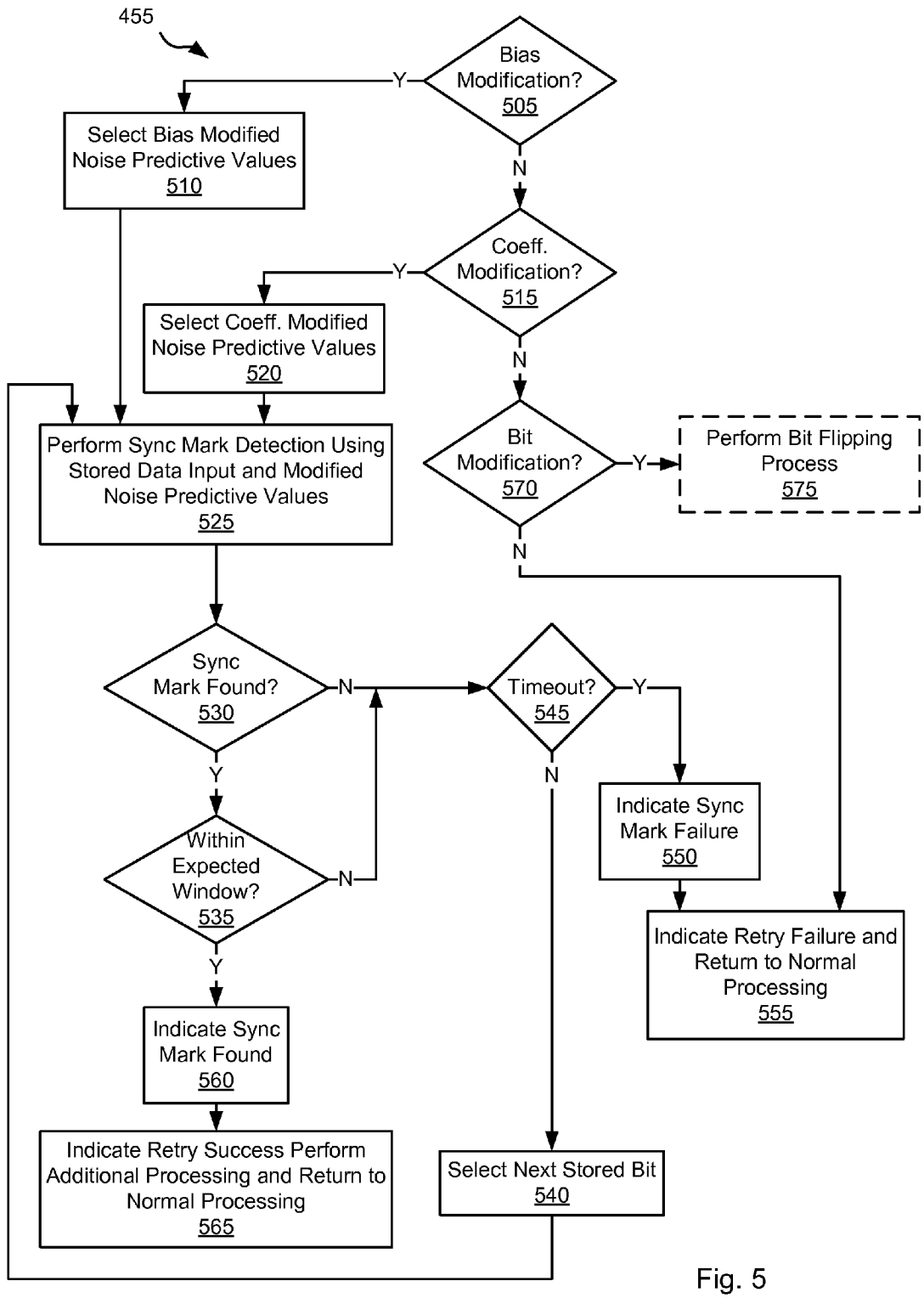
FIG. 5 is a flow diagram showing a method for bias modification, tap modification and/or bit flipping retry sync mark processing in accordance with some embodiments of the present invention.

Turning to FIG. 5, a flow diagram 500 shows a method for bias modification, tap modification and/or bit flipping retry sync mark processing in accordance with some embodiments of the present invention. Following flow diagram 500, it is determined whether the retry processing includes bias modification (block 505), coefficient modification (block 515) or bit modification (block 570).

Where bias modification is selected (block 505), bias modified noise predictive filter outputs are selected (block 510). This may include adding a bias value to one or more noise predictive filter outputs to increase the probability of finding certain patterns leading to the finding of a sync mark, and/or decrease the probability of finding other patterns that do not lead to the finding a sync mark. Alternatively, or in addition, bias modification may include subtracting a bias value from one or more noise predictive filter outputs to increase the probability of finding certain patterns leading to the finding of a sync mark, and/or decrease the probability of finding other patterns that do not lead to the finding a sync mark. As yet another alternative or addition, bias modification may include multiplying one or more noise predictive filter outputs by a bias value to increase the probability of finding certain patterns leading to the finding of a sync mark, and/or decrease the probability of finding other patterns that do not lead to the finding a sync mark.

A sync mark detection process is performed on the stored data input using the bias modified noise predictive outputs (block 525). Where a sync mark has been found (block 530), it is determined whether the identified sync mark occurred within a defined window (block 535). Where the sync mark was within the expected window (block 535), a sync mark found indication is asserted (block 560), a retry success is indicated, any additional processing is performed, and a return to normal processing (i.e., non-biased outputs from noise predictive filters are re-selected) (block 565).

Alternatively, where either a sync mark was not found (block 530) or an identified sync mark was outside of an expected window (block 535), it is determined whether a timeout condition occurred (block 545). Where a timeout condition has not occurred (block 545), the processes are repeated beginning with the reception of the next stored data input (block 540). Alternatively, where a timeout condition occurs (block 545), a sync mark failure is indicated (block 550), and a retry failure and return to normal processing (i.e., non-biased outputs from noise predictive filters are re-selected) is effectuated (block 555).

Where coefficient modification is selected (block 515), modified coefficient values are provided to one or more noise predictive filters (block 520). This may include applying different coefficient values to one or more of the noise predictive filters. The different coefficient values are designed to either increase the probability of finding certain patterns leading to the finding of a sync mark, and/or decrease the probability of finding other patterns that do not lead to the finding a sync mark.

A sync mark detection process is performed on the stored data input using coefficient modified noise predictive filters (block 525). Where a sync mark has been found (block 530), it is determined whether the identified sync mark occurred within a defined window (block 535). Where the sync mark was within the expected window (block 535), a sync mark found indication is asserted (block 560), a retry success is indicated, any additional processing is performed, and a return to normal processing (i.e., filter coefficients are returned to pre retry values) (block 565).

Figure 6:
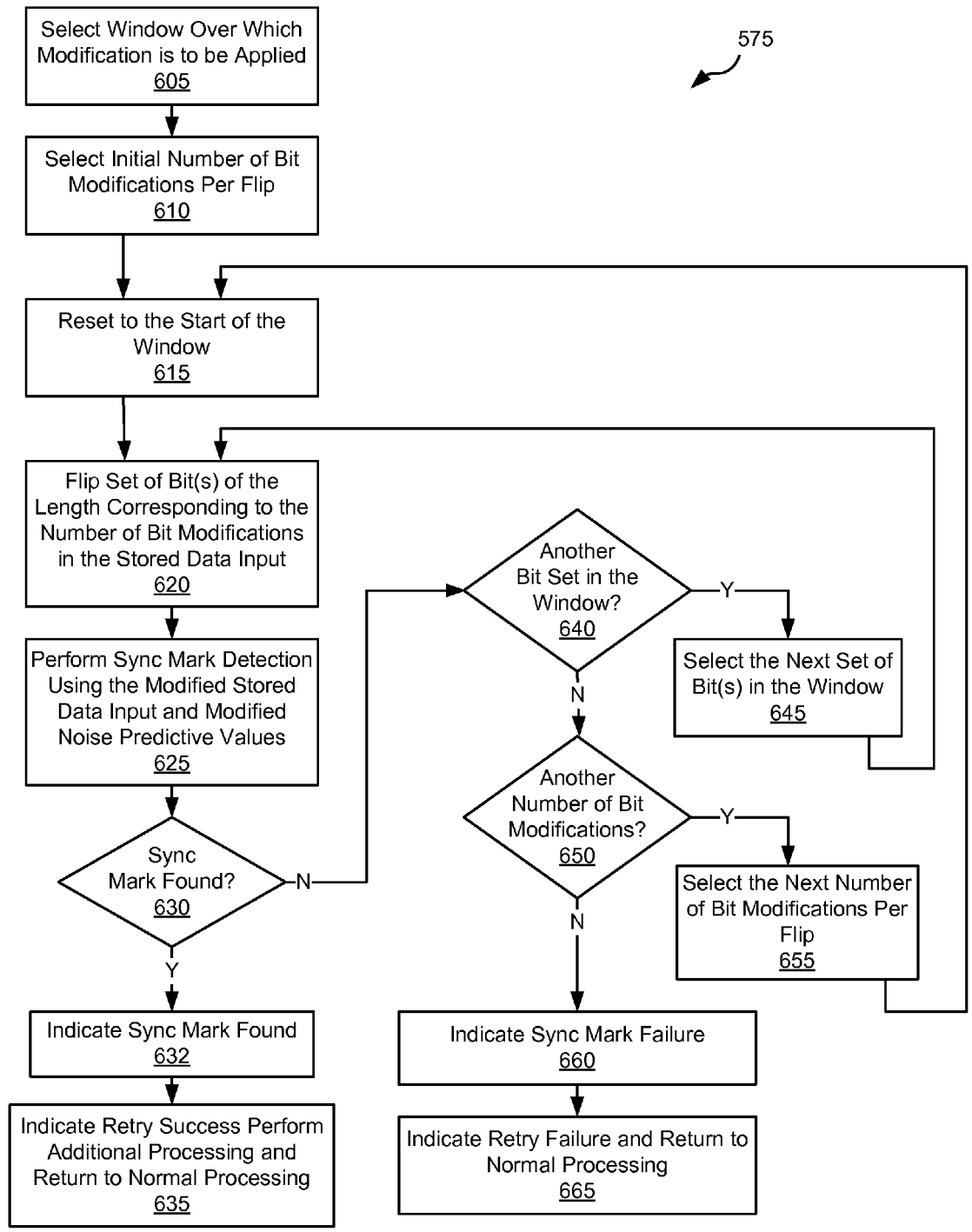
FIG. 6 is a flow diagram showing a method for bit flipping retry sync mark processing in accordance with some embodiments of the present invention.

Alternatively, where either a sync mark was not found (block 530) or an identified sync mark was outside of an expected window (block 535), it is determined whether a timeout condition occurred (block 545). Where a timeout condition has not occurred (block 545), the processes are repeated beginning with the reception of the next stored data input (block 540). Alternatively, where a timeout condition occurs (block 545), a sync mark failure is indicated (block 550), and a retry failure and return to normal processing (i.e., filter coefficients are returned to pre retry values) is effectuated (block 555).

Where a bit modification (i.e., bit flipping) approach is selected (block 570), a bit flipping process is performed (block 575). Turning to FIG. 6, a flow diagram 600 shows a method for bit flipping retry sync mark processing in accordance with some embodiments of the present invention. Following flow diagram 600, a window over which a sync mark is to be searched is selected (block 605). This window represents a number of bits of the stored data input where it is expected that the sync mark will be found. In addition, an initial number of bit modifications per flip is selected (block 610). In some embodiments, the initial number of flips is selected to be one flipped bit per processing. The processing is then reset to the beginning of the window (block 615). At this juncture the first bit(s) in the window corresponding to the selected number of bits to be flipped are changed from their current logic state (i.e., from a logic '0' to a logic '1' or from a logic '1' to a logic '0' (block 620). Thus, for example, where only a single bit is to be flipped, the first bit in the window is flipped. With this bit flipped, a sync mark detection process is performed on the stored data input modified to include the flipped bit (block 625).

During the processing, it is determined whether a sync mark has been found (block 630). Where a sync mark has been found (block 630), a sync mark found indication is asserted (block 632), a retry success is indicated, any additional processing is performed, and a return to normal processing (i.e., processing from the original data input) (block 635). Alternatively, where no sync mark is found (block 630) it is determined whether another bit of bits corresponding to the selected number of bits remain to be flipped within the selected window (block 640). Where additional bits remain to be flipped in the window (block 640), the next bit or bits corresponding to the selected number of bits are selected in the window (block 645). Then, the data is re-processed with the newly flipped bit(s) to determine whether a sync mark is found (block 620-block 640).

Alternatively, where no additional bits remain to be flipped in the window (block 640), it is determined whether another number of bits or bit combinations are to be tried (block 650). Thus, for example, where the initial process individually flipped a single bit at a time for each processing pass, it may be that the next pass flips two or more consecutive bits at a time. Alternatively a combination of bit flipping may be used where for example, three bits are considered for each bit flip, but only the outer two bits are flipped leaving the middle bit un-flipped. Based upon the disclosure provided herein, one of ordinary skill in the art will recognize a number of bits that can be flipped prior to each processing or patterns of bits that may be flipped on a given processing pass. Where another number or pattern of bit modifications are to be applied (block 650), the next number or pattern of bit modifications is selected (block 655). Then, the data is re-processed with the newly flipped bit(s) beginning at the start of the window to determine whether a sync mark is found (block 615-block 640). Alternatively, where no other number or patterns of bits remain to be flipped (block 650), a sync mark failure is indicated (block 660), and a retry failure and return to normal processing (i.e., processing of original data input rather than stored data input) is effectuated (block 665).

Figure 7:
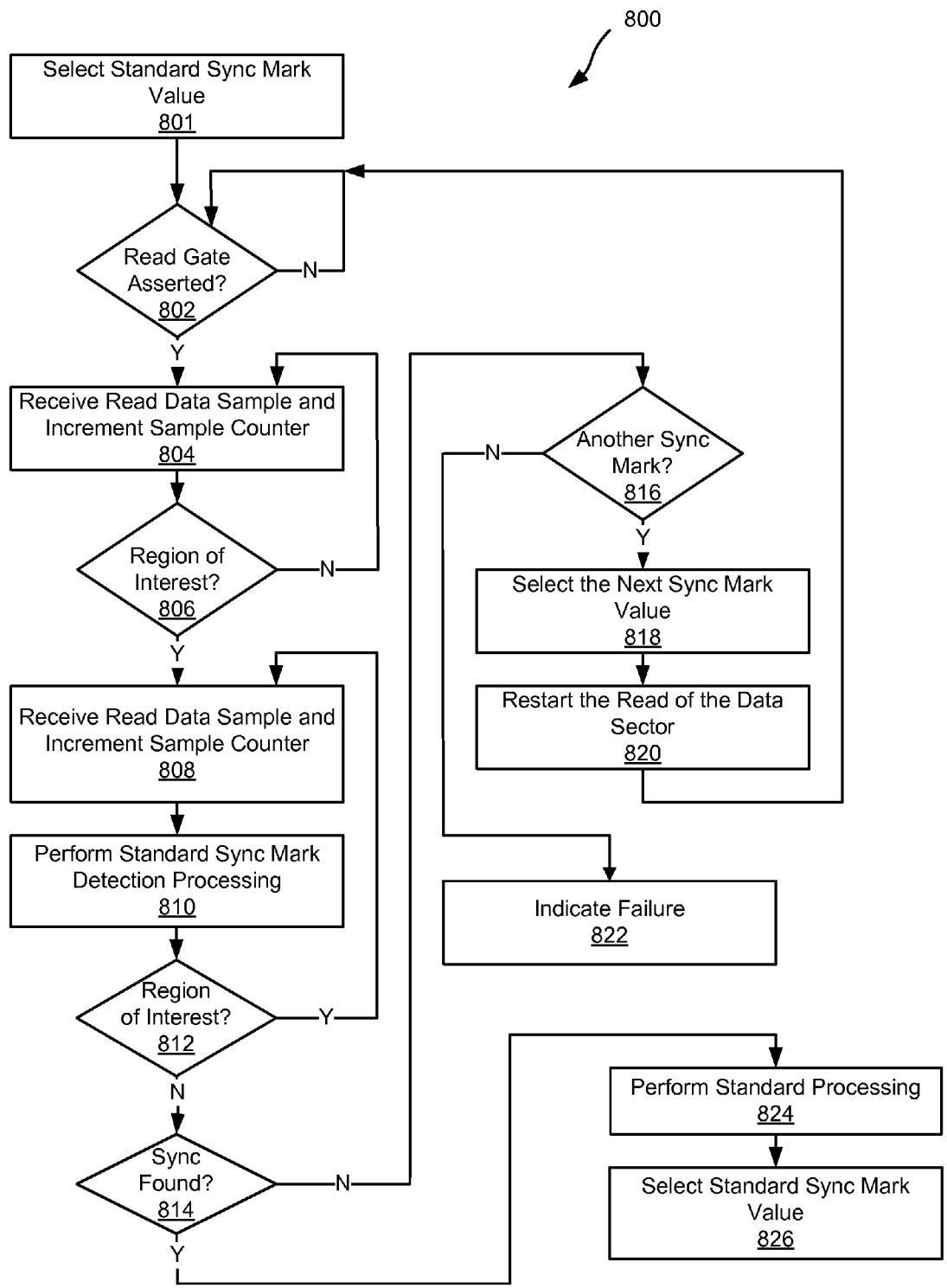
FIG. 7 is a flow diagram depicting a method for bit flipping retry sync mark processing in accordance with other embodiments of the present invention.

Turning to FIG. 7, a flow diagram 800 depicting a method for bit flipping retry sync mark processing in accordance with other embodiments of the present invention. Following flow diagram 800 the default or standard sync mark pattern is selected (block 801). This may be done, for example, by programming a sync mark register to include the pattern of the standard sync mark. Next, it is determined whether a read gate is asserted (block 802). The read gate is a signal that when asserted indicates that data from a user data region of a storage medium is being received. Each data sample is received and a sample counter is incremented (block 804). The sample count indicates a distance or number of samples from assertion of the read gate signal.

A sync mark and other identification information is placed in a header of data at a defined location within the user data region. A window is opened (i.e., a region of interest) around an expected location of the header of data (block 806). Where the data being received is outside of the region of interest (block 806), additional samples are received and the sample counter is incremented (block 804). Otherwise, where the data received is within the region of interest (block 806), the received data samples from within the region of interest are received and the sample counter is incremented (block 808). The received data is queried to determine if a sync mark was included therein (block 810).

Once all data from the region of interest has been received and a sync mark was found (blocks 812, 814), the subsequent data is received and standard data processing is applied using the received sync mark information (block 824). In addition, the standard sync mark value is selected (block 826). This may be done, for example, by programming a sync mark register to include the pattern of the standard sync mark. Otherwise, where by the end of processing the data within the region interest a sync mark is not found (block 814), bit flipping of the sync mark is performed.

Bit flipping the sync mark includes determining whether there is another sync mark pattern that is yet to be tried (block 816). Where no additional sync mark patterns (i.e., bit flipping in the sync mark pattern) remain to be done (block 816), the process ends without finding a sync mark and a failure is indicated (block 822). Otherwise, where additional patterns remain to be tested (block 816), the next sync mark value (i.e., with one or more bits in the pattern flipped) is selected (block 818). This selection includes writing the bit flipped sync mark pattern to the sync mark register. The read of the data sector is restarted (block 820). This restart may include, for example, re-reading the sector of data from the storage medium. Alternatively, this restart may include reprocessing data samples that were stored in a buffer on the initial read from the storage medium. The processes of blocks 804, 806, 808, 810, 812, 814 are performed on the re-read or re-processed data to determine whether a sync mark matching the bit flipped sync mark can be found. Where the bit flipped sync mark is found, the subsequent data is received and standard data processing is applied using the received sync mark information (block 824). In addition, the standard sync mark value is selected (block 826). This may be done, for example, by programming a sync mark register to include the pattern of the standard sync mark.

Figure 8:
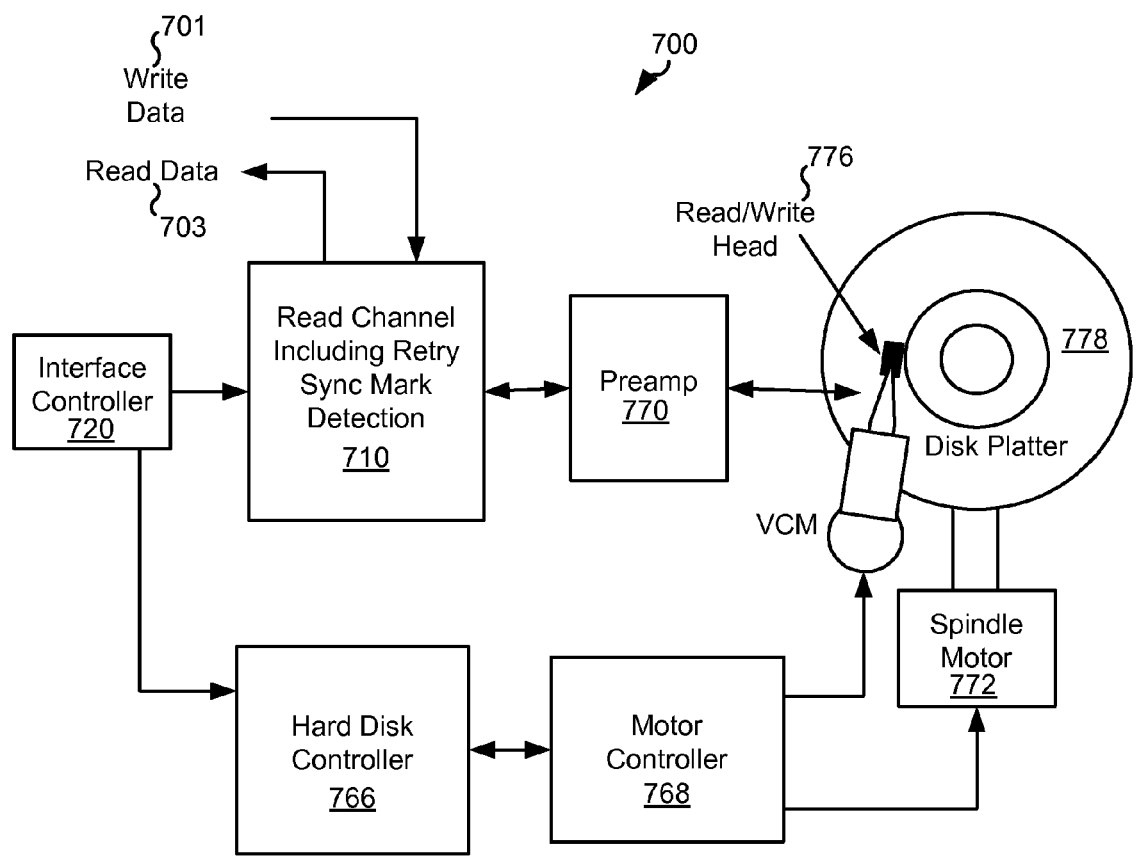
FIG. 8 shows a storage system including a read channel circuit with retry sync mark detection in accordance with some embodiments of the present invention.

Turning to FIG. 8, a storage system 700 including a read channel circuit 710 with retry sync mark detection is shown in accordance with various embodiments of the present invention. Storage system 700 may be, for example, a hard disk drive. Storage system 700 also includes a preamplifier 770, an interface controller 720, a hard disk controller 766, a motor controller 768, a spindle motor 772, a disk platter 778, and a read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with either a longitudinal or a perpendicular recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel module 364 via preamplifier 770. Preamplifier 770 is operable to amplify the minute analog signals accessed from disk platter 778. In turn, read channel circuit 710 decodes and digitizes the received analog signal to recreate the information originally written to disk platter 778. This data is provided as read data 703 to a receiving circuit. As part of decoding the received information, read channel circuit 710 performs a sync mark detection process. Such a sync mark detection process may be performed using a sync mark detection circuit similar to that disclosed above in relation to FIG. 2. The sync mark detection process may be done in accordance with one or more of the methods discussed above in relation to FIGS. 4-6. A write operation is substantially the opposite of the preceding read operation with write data 701 being provided to read channel circuit 710. This data is then encoded and written to disk platter 778.

It should be noted that storage system 700 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

It should be noted that while various embodiments of the present invention have been discussed that include buffering data that is read from a storage medium and re-processing the buffered data without a re-read of the storage medium, the same processing can be applied where no buffering is used by re-reading the storage medium upon each re-processing. Further, It should be noted that where an embodiment is discussed as utilizing a re-read from the storage medium for each re-processing, that buffering of the read data may be used which allows re-processing from the buffered data.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for sync mark detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A sync mark detection circuit, wherein the circuit further comprises:
    a storage circuit operable to store a data input as a stored input;
    a plurality of noise predictive filters operable to receive a processing input, wherein at least one of the noise predictive filters is selectably modifiable between increasing the probability of finding a sync mark in the processing input and maintaining a baseline probability of finding the sync mark in the processing input; and
    a controller circuit, wherein the controller circuit is operable to determine an operational mode selected from a group consisting of: a standard operational mode, a bit flipping mode, and a filter modification mode, and wherein:
    upon selecting the standard operational mode the controller circuit is further operable to:
    select the data input as the processing input; and
    selectably modify the at least one of the noise predictive filters to maintain a baseline probability of finding the sync mark in the processing input;
    upon selecting the bit flipping mode the controller circuit is further operable to:
    modify at least one bits in the stored input to yield a modified input;
    select the modified input as the processing input; and
    selectably modify the at least one of the noise predictive filters to maintain a baseline probability of finding the sync mark in the processing input; and
    upon selecting the filter modification mode the controller circuit is further operable to:
    select the stored input as the processing input; and
    selectably modify the at least one of the noise predictive filters to increase the probability of finding a sync mark in the processing input.

2. The circuit of claim 1, wherein the circuit is implemented as part of an integrated circuit.

3. A sync mark detection circuit, the circuit comprising:
    a plurality of noise predictive filters operable to receive a processing input, wherein at least one of the noise predictive filters is selectably modifiable to bias an output of the noise predictive filter to increase the probability of finding a transition supported by the noise predictive filter, and wherein increasing the probability of finding the transition increases the probability of finding the sync mark in the processing input.

4. The circuit of claim 3, wherein each of the noise predictive filters provides a respective noise predicted output, and wherein the circuit further comprises:
    a data detector circuit operable to receive the respective noise predicted outputs and to provide a series of detected bits corresponding to the processing input.

5. The circuit of claim 3, wherein biasing the output includes adding an offset to the output.

6. The circuit of claim 3, wherein biasing the output includes multiplying the output by a value greater than unity.

7. The circuit of claim 3, wherein the circuit further comprises a storage circuit operable to store a data input as a stored input, and wherein the processing input is the stored input when the at least one of the noise predictive filters is selectably modified to increase the probability of finding the transition; and wherein the processing input is the data input when the at least one of the noise predictive filters is selectably modified to maintain a baseline probability of finding the transition.

8. A sync mark detection circuit, wherein the circuit further comprises:
    a storage circuit operable to store a data input as a stored input; and
    a controller circuit, wherein the controller circuit is operable to determine an operational mode selected from a group consisting of: a standard operational mode and a bit flipping mode, and wherein:

upon selecting the standard operational mode the controller circuit is further operable to: select the data input as a processing input, and select querying the processing input for a sync mark; and upon selecting the bit flipping mode the controller circuit is further operable to: modify at least one bit in the stored input to yield a modified input, select the modified input as the processing input, and to select querying the processing input for the sync mark.

9. The circuit of claim 8, wherein the circuit further comprises:
a plurality of noise predictive filters operable to receive a processing input and to provide a plurality of outputs corresponding to the processing input, wherein at least one of the noise predictive filters is selectably modifiable between increasing the probability of finding the sync mark in the processing input and maintaining a baseline probability of finding the sync mark in the processing input.

10. The circuit of claim 9, wherein the controller circuit is further operable to determine an operational mode selected from a group consisting of: a standard operational mode, a bit flipping mode, and a filter modification mode; and wherein the controller circuit is further operable to:
upon selecting the standard operational mode the controller circuit is further operable to:
selectably modify the at least one of the noise predictive filters to maintain a baseline probability of finding the sync mark in the processing input;
upon selecting the bit flipping mode the controller circuit is further operable to:
selectably modify the at least one of the noise predictive filters to maintain a baseline probability of finding the sync mark in the processing input; and
upon selecting the filter modification mode the controller circuit is further operable to:
select the stored input as the processing input; and
selectably modify the at least one of the noise predictive filters to increase the probability of finding a sync mark in the processing input.

11. The circuit of claim 8, wherein the modified input is a first modified input, wherein the at least one bit is a first set of bits, and wherein the controller circuit is further operable to:
modify a second set of bits in the stored input to yield a second modified input;
select the second modified input as the processing input; and
select querying the processing input for a sync mark.

12. The circuit of claim 11, wherein the first set of bits is a single bit, and wherein the second set of bits is a single bit.

13. The circuit of claim 11, wherein the first set of bits overlaps the second set of bits.

14. The circuit of claim 11, wherein the first set of bits is mutually exclusive of the second set of bits.

15. The circuit of claim 11, wherein the first set of bits are non-consecutive bits in the stored input.

16. The circuit of claim 8, wherein the circuit is implemented as part of an integrated circuit.

17. A sync mark detection circuit, the circuit comprising:
a plurality of noise predictive filters operable to receive a processing input, wherein at least one of the noise predictive filters is selectably modifiable to bias an output of the noise predictive filter to decrease the probability of finding a transition supported by the noise predictive filter, and wherein decreasing the probability of finding the transition increases the probability of finding the sync mark in the processing input.

18. The circuit of claim 17, wherein biasing the output includes adding an offset to the output.

19. The circuit of claim 17, wherein biasing the output includes multiplying the output by a value greater than unity.

20. The circuit of claim 17, wherein the circuit further comprises a storage circuit operable to store a data input as a stored input, and wherein the processing input is the stored input when the at least one of the noise predictive filters is selectably modified to increase the probability of finding the transition; and wherein the processing input is the data input when the at least one of the noise predictive filters is selectably modified to maintain a baseline probability of finding the transition.

21. A sync mark detection circuit, the circuit comprising:
a plurality of noise predictive filters operable to receive a processing input, wherein at least one of the noise predictive filters is selectably modifiable by modifying a filter coefficient to increase the probability of finding a transition supported by the noise predictive filter, and wherein increasing the probability of finding the transition increases the probability of finding the sync mark in the processing input.

22. The circuit of claim 21, wherein biasing the output includes adding an offset to the output.

23. The circuit of claim 21, wherein biasing the output includes multiplying the output by a value greater than unity.

24. The circuit of claim 21, wherein the circuit further comprises a storage circuit operable to store a data input as a stored input, and wherein the processing input is the stored input when the at least one of the noise predictive filters is selectably modified to increase the probability of finding the transition; and wherein the processing input is the data input when the at least one of the noise predictive filters is selectably modified to maintain a baseline probability of finding the transition.

25. A sync mark detection circuit, the circuit comprising:
a plurality of noise predictive filters operable to receive a processing input, wherein at least one of the noise predictive filters is selectably modifiable by modifying a filter coefficient to decrease the probability of finding a transition supported by the noise predictive filter, and wherein decreasing the probability of finding the transition increases the probability of finding the sync mark in the processing input.

26. The circuit of claim 25, wherein biasing the output includes adding an offset to the output.

27. The circuit of claim 25, wherein biasing the output includes multiplying the output by a value greater than unity.

28. The circuit of claim 25, wherein the circuit further comprises a storage circuit operable to store a data input as a stored input, and wherein the processing input is the stored input when the at least one of the noise predictive filters is selectably modified to increase the probability of finding the transition; and wherein the processing input is the data input when the at least one of the noise predictive filters is selectably modified to maintain a baseline probability of finding the transition.

29. A sync mark detection circuit, the circuit comprising:
a plurality of noise predictive filters operable to receive a processing input, wherein at least one of the noise predictive filters is selectably modifiable to change the favorability of finding a sync mark in the processing input;
a storage circuit operable to store a data input as a stored input; and
a controller circuit, wherein the controller circuit is operable to modify at least one bit in the stored input to yield a modified input, and wherein the controller circuit is operable to provide the modified input as the processing input when a retry condition is requested and when the at least one of the noise predictive filters is selectably modified to maintain a baseline probability of finding a transition particular to the at least one of the noise predictive filters.

30. The circuit of claim 29, wherein the controller circuit is further operable to successively modify different bits in the stored input to yield the modified input and to select reprocessing of the modified input.

* * * * *